Patented Sept. 18, 1945

2,384,883

UNITED STATES PATENT OFFICE 2,384,883

VINYLIDENE CHLORIDE COMPOSITIONS

Edgar C. Britton and Harold W. Moll, Midland, Mich., assignors to The Dow Chemical Company, Midland, Mich., a corporation of Michigan No Drawing. Application July 18, 1941, Serial No. 403,015

3 Claims. (Cl. 260—42)

This invention relates to thermoplastic compositions comprising polymeric vinylidene chloride products modified with toluene sulfonamide-aldehyde resins.

As herein used, the term "polymeric vinylidene chloride product" includes the polymer of vinylidene chloride alone and other products, whether polymers, co-polymers, interpolymers, or otherwise named, which may be obtained by polymerizing together monomeric vinylidene chloride and one or more of the monomers of other polymerizable materials, such as vinyl chloride, vinyl acetate, vinyl ethers, acrylic and methacrylic acids and esters thereof, acrylic nitrile, butadiene, styrene, allyl chloride and the allyl, methallyl, crotonyl, 2-chloroallyl, or cinnamyl esters of mono and dicarboxylic acids. The polymer of vinylidene chloride alone is described in U. S. Patent No. 2,160,903 and many of its co-polymers with other polymerizable compounds, as well as certain plasticized compositions comprising these co-polymers, and ways in which the products may be made, are described in U. S. Patents 2,160,904; 2,206,022; 2,215,379 and 2,160,931 to 2,160,948, inclusive.

Toluene sulfonamide-aldehyde resins are the products obtained by reacting toluene sulfonamide or a derivative thereof with an aldehyde. The resins are stable to light and vary from soft plastics to hard brittle resins. The resins prepared by reacting toluene sulfonamide with formaldehyde are most widely used as plastics.

According to the present invention, toluene sulfonamide-aldehyde resins are incorporated with a polymeric vinylidene chloride product to produce a mass which can be molded or extruded to form articles having a waxy "handle" and high gloss. For example, a toluene sulfonamide-aldehyde resin may be incorporated with a polymeric vinylidene chloride product having a softening point only slightly below its decomposition point to produce a mass that may be extruded at relatively low temperatures and pressures to form valuable articles, threads, bands, filaments, foils, and the like, which retain the high tensile strength and toughness shown by the parent polymeric vinylidene chloride product. Furthermore, addition of toluene sulfonamide-aldehyde resins to a polymeric vinylidene chloride product, in many cases, has a plasticizing effect, particularly at elevated temperatures, and produces a mass that has thermoplastic properties superior to the polymeric vinylidene chloride product alone, and may be molded or shaped to form useful articles having a tough, durable finish with a high gloss, and which retain a resistance to chemicals typical of polymeric vinylidene chloride products.

The addition of the toluene sulfonamide-aldehyde resins to the polymeric vinylidene chloride product may be effected by any of several methods. For example, the polymeric vinylidene chloride product and the particular toluene sulfonamide-aldehyde resin to be employed may be mixed or ground together in a ball mill or other suitable mixer commonly employed in the plastic art, or they may be added to the polymer on hot rolls in a method similar to compounding rubber compositions. Another satisfactory method of incorporating the toluene sulfonamide-aldehyde resin with the polymeric vinylidene chloride product is to dissolve the resin in a readily volatile solvent and mix or grind the materials in any suitable apparatus such as a ball mill, thereafter evaporating the solvent. To effect complete homogenization of the composition, it should preferably be heated to a fusion temperature.

The following examples illustrate the practice of the invention but are not to be construed as limiting the scope thereof:

Example 1

2.5 grams of Santolite MHP, a toluene sulfonamide-formaldehyde resin, having a melting point of 60°–65° C. and 5.0 grams of tributyl aconitate, to serve as a heat stabilizer, were incorporated with 20 milliliters of acetone. To this solution was added 42.5 grams of a co-polymer consisting of 90 per cent vinylidene chloride and 10 per cent vinyl chloride. The mixture was ground until thoroughly blended and then dried. The composition could easily be molded or extruded and filaments, having a diameter of 0.015 inch, prepared from this material were flexible glossy threads with a waxy handle and had a tensile strength above 36,000 pounds per square inch.

Example 2

0.5 gram of Santolite MHP and 5.0 grams of di-(alpha-phenylethyl) ether, to serve as a heat stabilizer, were incorporated with 18 milliliters of acetone. To this solution was added 44.5 grams of a co-polymer as in Example 1. The composition could easily be molded or extruded and filaments having a diameter of 0.015 inch prepared from this material were flexible glossy threads with a waxy handle and had a tensile strength above 41,000 pounds per square inch.

*Example 3*

5.0 grams of Santolite MHP and 5.0 grams of di-(alpha-phenylethyl) ether were incorporated with 18 milliliters of acetone. To this solution was added 40.0 grams of a co-polymer as in Example 1. The composition could easily be molded and extruded and filaments having a diameter of 0.011 inch prepared from this material were flexible tough threads with a high gloss and had a tensile strength above 41,000 pounds per square inch.

The compositions may contain varying amounts of the toluene sulfonamide-aldehyde resins, depending on the use requirements. In the practice of the invention it is preferred to use from about 0.5 to about 40 per cent, and, more specifically between about 2.0 and about 7.5 per cent of the toluene sulfonamide-aldehyde resin, based on the weight of the polymeric vinylidene chloride product used, but more or less than the suggested amounts may be used.

While the above examples show the preparation of compositions from a polymeric vinylidene chloride product consisting of a co-polymer of 90 per cent vinylidene chloride and 10 per cent vinyl chloride, incorporated with toluene sulfonamide-aldehyde resins, other polymeric vinylidene chloride products which have wide commercial value and which may be advantageously used in preparing the new compositions include the co-polymers containing from about 5 to about 30 per cent of vinyl chloride and correspondingly from about 95 to about 70 per cent of vinylidene chloride. Other co-polymers, in like proportions with vinylidene chloride, as included herein under the definition of the term, "polymeric vinylidene chloride product," form equally valuable compositions.

In preparing molded or extruded articles from the new polymeric vinylidene chloride compositions at temperatures above their respective softening points, where the material is often maintained for a considerable period of time, it is desirable to have present in the composition a heat-stabilizing agent which acts to decrease or prevent thermal decomposition. A substance which will also prevent darkening on exposure to light is often desirable. Compounds applicable for these purposes include 1,2-epoxy-3-(2-phenylphenoxy) propane, allyl-disulfide, 2-chloroallyl-disulfide, 2,2'-dihydroxybenzophenone, tributyl aconitate, dipropyl maleate, 2-phenoxyethyl cinnamate, and di-(alpha-phenylethyl) ether.

The incorporation of minor amounts of coloring agents, fillers, plasticizers and the like has also been found to be useful as described when used in such amounts that the desirable mechanical properties of the product are not affected.

As will be seen from the above description, the properties of polymeric vinylidene chloride products can be varied widely, according to the amount and type of toluene sulfonamide-aldehyde resin incorporated therein, to produce products that are useful in the preparation of articles of all kinds. The herein described compositions, have among others, the following advantages: (1) they have low molding and softening temperatures well below their thermal decomposition temperatures, (2) they may be molded or extruded at relatively low pressure to form valuable articles, filaments, threads, bands, or foils, (3) they are substantially more compatable with many lacquer solvents than the polymeric vinylidene chloride product alone, (4) and they are heat stable masses which may be worked to produce articles having a tough, durable, and glossy finish.

Other modes of applying the principle of our invention may be employed instead of those explained, change being made as regards the materials employed, provided the product recited in the following claims be obtained.

We therefore point out and distinctly claim as our invention:

1. A thermoplastic molding and extrusion composition, the essential ingredients of which are a copolymer of from about 5 to about 30 per cent of vinyl chloride and correspondingly from about 95 to about 70 per cent of vinylidene chloride, and from about 0.5 to about 40 per cent, based on the weight of copolymer, of a toluene sulfonamide-formaldehyde resin having a melting point in the range from about 60° to about 65° C.

2. A thermoplastic composition, the essential ingredients of which are a polymer of vinylidene chloride, wherein the vinylidene chloride constitutes at least 70 per cent of the polymer, and between about 0.5 and about 40 per cent of a toluene sulfonamide-aldehyde resin, based on the weight of the polymer.

3. A thermoplastic composition, the essential ingredients of which are a polymer of vinylidene chloride, wherein the vinylidene chloride constitutes at least 70 per cent of the polymer, and between about 0.5 and about 40 per cent, based on the weight of the polymer, of a toluene sulfonamide-formaldehyde resin having a melting point in the range from about 60° to about 65° C.

EDGAR C. BRITTON.
HAROLD W. MOLL.